(12) United States Patent
Doebert et al.

(10) Patent No.: US 8,394,912 B2
(45) Date of Patent: Mar. 12, 2013

(54) PROCESS AND APPARATUS FOR THE PREPARATION OF POLYCARBONATE

(75) Inventors: Frank Doebert, Shanghai (CN);
Andreas Stremmel, Willich (DE);
Christoph Biedron, Moers (DE);
Stephan Laue, Antwerpen (BE);
Johann Rechner, Kerpen (DE); Torsten Hagen, Essen (DE); Frank Bruynseels, Sint Gillis (BE); Frank Quaeyhaegens, Schoten (BE); Johan Decloedt, Hulst (NL); Paul Van Dorst, Merksplas (BE);
Uwe Arndt, Ekeren (BE); Johan Vanden Eynde, Zwijnaarde (BE);
Ursula Tracht, Leverkusen (DE);
Thomas König, Leverkusen (DE);
Ulrich Liesenfelder, Bergisch Gladbach (DE)

(73) Assignee: Bayer MaterialScience AG (DE)

( * ) Notice: Subject to any disclaimer, the term of this patent is extended or adjusted under 35 U.S.C. 154(b) by 0 days.

(21) Appl. No.: 12/973,272

(22) Filed: Dec. 20, 2010

(65) Prior Publication Data

US 2011/0184144 A1 Jul. 28, 2011

(30) Foreign Application Priority Data

Dec. 22, 2009 (DE) .................. 10 2009 059 990

(51) Int. Cl.
*C08G 63/02* (2006.01)
*C08G 64/00* (2006.01)

(52) U.S. Cl. ......... 528/196; 148/242; 422/131; 528/198

(58) Field of Classification Search .................. 148/242; 422/131; 528/196, 198
See application file for complete search history.

(56) References Cited

U.S. PATENT DOCUMENTS

| | | | |
|---|---|---|---|
| 3,404,122 A | 10/1968 | Fritz et al. | |
| 4,318,773 A | 3/1982 | Ullrich et al. | |
| 4,423,205 A | 12/1983 | Rajan | |
| 4,627,949 A | 12/1986 | Dhein et al. | |
| 4,980,105 A | 12/1990 | Schmidt et al. | |
| 4,982,014 A | 1/1991 | Freitag et al. | |
| 5,126,428 A | 6/1992 | Freitag et al. | |
| 5,227,458 A | 7/1993 | Freitag et al. | |
| 5,306,803 A | 4/1994 | Arlt et al. | |
| 6,117,251 A | 9/2000 | Rivera | |
| 6,254,980 B1 * | 7/2001 | Tadokoro et al. | ............. 428/323 |
| 6,887,970 B2 | 5/2005 | Kratschmer et al. | |
| 7,901,467 B2 * | 3/2011 | Ebert et al. | .................. 23/295 R |
| 7,954,980 B2 * | 6/2011 | Bryant et al. | ................. 362/287 |
| 2002/0011281 A1 | 1/2002 | Geke et al. | |
| 2004/0120686 A1 | 6/2004 | Behrens et al. | |
| 2008/0154018 A1 | 6/2008 | Ebert et al. | |
| 2008/0210343 A1 | 9/2008 | Ebert et al. | |

FOREIGN PATENT DOCUMENTS

| | | |
|---|---|---|
| BE | 866991 A1 | 11/1978 |
| CH | 580685 A5 | 10/1976 |
| DE | 3332065 A1 | 3/1985 |
| DE | 3832396 A1 | 2/1990 |
| DE | 4129529 A1 | 3/1993 |
| DE | 19621184 A1 | 12/1997 |
| EP | 0003996 A1 | 9/1979 |
| EP | 0256003 A1 | 2/1988 |
| EP | 0267025 A1 | 5/1988 |
| EP | 0386616 A2 | 9/1990 |
| EP | 0411510 A2 | 2/1991 |
| EP | 0460450 A2 | 12/1991 |
| EP | 0512223 A1 | 11/1992 |
| EP | 0534189 A1 | 3/1993 |
| EP | 0635532 A2 | 1/1995 |
| EP | 0819717 A1 | 1/1998 |
| EP | 0905184 A2 | 3/1999 |
| EP | 1155737 A1 | 11/2001 |
| EP | 1156071 A1 | 11/2001 |
| EP | 1383821 A2 | 1/2004 |
| FR | 1561518 A | 3/1969 |
| GB | 1229482 A | 4/1971 |
| JP | 6-329784 | 11/1994 |
| JP | 8118675 A | 5/1996 |
| WO | WO-87/04637 A1 | 8/1987 |
| WO | WO-02/37148 A2 | 5/2002 |
| WO | WO-02/077067 A2 | 10/2002 |

* cited by examiner

*Primary Examiner* — Terressa Boykin
(74) *Attorney, Agent, or Firm* — Novak Druce Connolly Bove + Quigg LLP

(57) ABSTRACT

The invention relates to a process for the pretreatment of material surfaces in order to minimize the interaction between polycarbonate and metal and, in the processing and synthesis of polycarbonate, to obtain a high-quality polymer which in particular does not become discolored and is free of insoluble constituents.

10 Claims, No Drawings

PROCESS AND APPARATUS FOR THE PREPARATION OF POLYCARBONATE

RELATED APPLICATIONS

This application claims benefit to German Patent Application No. 10 2009 059 990.8, filed Dec. 22, 2009, which is incorporated herein by reference in its entirety for all useful purposes.

BACKGROUND OF THE INVENTION

The invention relates to a process for the pretreatment of material surfaces and the use of these passivated materials in the preparation or processing of polycarbonates.

By means of this process, it is possible to minimize the interaction between polycarbonate and metal and, in the processing and synthesis of polycarbonate, to obtain a high-quality polymer which in particular does not become discoloured and is free of insoluble constituents.

The polycarbonate synthesis can be carried out continuously or batchwise. The reaction can therefore be effected in stirred vessels, tubular reactors, pumped-circulation reactors or stirred vessel cascades or combinations thereof. Typical materials for these stirred vessels or tubular reactors and pipelines, etc., are, for example, V4A steel 1.4571 or Hastelloy-C.

The washing of the polycarbonate solution is effected by passages through settling vessels, stirred vessels, coalescers or separators or combinations of these measures. These plant components likewise consist of the abovementioned materials.

The isolation of the polymer from the solution can be effected by evaporation of the solvent by means of temperature, vacuum or a heated entraining gas. Other isolation methods are crystallization and precipitation. These process steps, too, are carried out in containers comprising the abovementioned media. In a thermal work-up process, the material used is of particular importance owing to the higher temperature. Such a thermal work-up process is, for example, removal of the solvent by distillation by superheating and depressurization, a so-called "flash process" (also see "Thermische Trennverfahren [Thermal separation processes]" [VCH Verlagsanstalt 1988, page 114). All these processes are described in the patent literature and in text books and are familiar to the person skilled in the art. On removal of the solvent by means of temperature (distilling off) and the technically more effective flash process, highly concentrated polymer melts are obtained. The residues of the solvent can be removed from the highly concentrated polymer melts thus obtained, either directly from the melt by means of vented extruders (BE-A 866 991, EP-A 0 411 510, U.S. Pat. No. 4,980,105, DE-A 33 32 065), thin-film evaporators (EP-A 0 267 025), falling-film evaporators, strand evaporators or by friction compacting (EP-A 0 460 450), optionally also with addition of an entraining agent, such as nitrogen or carbon dioxide, or with the use of a vacuum (EP-A 0 039 96, EP-A 0 256 003, U.S. Pat. No. 4,423,207). Here too, the material used, which is in contact with the polymer melt, has a special role.

The polycarbonate prepared with the aid of this process is suitable in particular for high-quality injection moulded articles, in particular those in which high transparency and low YI (yellowness index) are important, such as, for example, optical data stores, diffuser screens or panes for the automotive sector generally.

It is known that, during processing and synthesis of polycarbonate, the contact with material surfaces, in particular at elevated temperatures, for long residence times and with use of iron-containing materials, damage to the polycarbonate is caused. The damage manifests itself in a deterioration of the colour (yellowing) and the formation of insoluble fractions. This damage is particularly evident on contact with fresh surfaces of stainless steels, for example in start-up processes. The damage, in particular yellowing, of polycarbonate in the presence of steel surfaces or metal ions has been comprehensively described before, for example in EP0819717, EP0905184, EP0386616.

The prior art comprises various approaches for minimizing this polycarbonate damage.

WO2002037148, EP1383821, EP0512223, EP1155737 and EP0635532 describe the use of high-quality materials having a low iron content. Owing to the high costs for the procurement and processing of particularly low-iron alloys, the wide use of such high-quality materials is not an economically expedient solution. The material composition stated in EP1155737 and having nickel contents of 5-15% and chromium contents of 10-20% is moreover not adequate for keeping the polycarbonate damage in the desired low range under typical synthesis and processing conditions.

EP0905184 describes the use of phosphite diesters as stabilizing additives to the polycarbonate, which suppress the interaction with metal ions. The metering of a stabilizer is generally undesired owing to the change in the product composition or because of an effect on the reaction.

US20080154018, US20080210343, EP1156071, EP0819717 describe treatment methods for making metallic materials inert to polycarbonate. The methods described in US20080154018, US20080210343, EP1156071 and EP0819717 are very complicated and the result is inadequate. In EP1156071 and EP0819717, various wash processes are combined with thermal treatment of the metal surface. US20080154018 and US20080210343 describe thermal and thermal oxidative treatment steps. In addition, the object in US20080154018 and US20020210343 was to reduce the formation of fluorescent particles, while the person skilled in the art finds no indication in these laid-open-applications as to how he can enhance colour and insoluble residues.

The use of phosphate for improving the corrosion resistance is known and is described, for example, in CH-580685, JP-81018675, DE-4129529, DE-19621184, U.S. Pat. No. 6,117,251, C. A. Melendres et al., Electrochimica Acta 34 (1989) 281. As a rule, aqueous phosphate or phosphoric acid solutions are used for the treatment of the metal surfaces with the aim of improving the resistance of the metal surface to corrosion. That such a treatment of the surfaces may lead to an improved polycarbonate quality is however not mentioned.

It is therefore the object of the invention to develop a simple method for the pretreatment of steel surfaces which minimizes the interaction of the metal surface with polycarbonate and thus reduces or as far as possible suppresses the damage. Ideally, this method should also be capable of being used directly in operation on existing apparatuses and machines, not only during production or before the assembly of new apparatuses.

EMBODIMENTS OF THE INVENTION

An embodiment of the present invention is a process for passivating the metal surface of an apparatus used for preparing or processing polycarbonates comprising the step of treating said metal surface with a polycarbonate melt comprising one or more phosphorus compounds at least partly in the regions of said metal surface which are in contact with reagents.

Another embodiment of the present invention is the above process, wherein said treatment is effected with said polycarbonate melt comprising one or more phosphorus compounds at a temperature in the range of from 280 to 480° C. with a residence time of from 1 to 24 hours.

Another embodiment of the present invention is the above process, wherein the concentration of said one or more phosphorus compounds in said polycarbonate melt is in the range of from 0.1 g to 5000 g of phosphate per $m^2$ of metal surface.

Another embodiment of the present invention is the above process, wherein said one or more phosphorus compounds are phosphoric acid or phosphoric acid derivatives or organic phosphate compounds.

Another embodiment of the present invention is the above process, wherein said one or more phosphorus compounds is a phosphite or a phosphate.

Another embodiment of the present invention is the above process, wherein said treatment is effected in the presence of an oxygen-containing gas or under inert gas.

Another embodiment of the present invention is the above process, wherein said metal surface is thermally pretreated in an oxidizing atmosphere before the treatment with said polycarbonate melt comprising one or more phosphorus compounds.

Yet another embodiment of the present invention is an apparatus for preparing or processing of polycarbonates, wherein the metal surfaces used in the preparation or processing of said polycarbonates have been passivated according to the above process.

Yet another embodiment of the present invention is a process for preparing polycarbonate comprising the step of obtaining polycarbonate via melt polycondensation of a bisphenol with a carbonate diester in the above apparatus.

Another embodiment of the present invention is the above process, wherein said bisphenol is bisphenol A.

DESCRIPTION OF THE INVENTION

It was surprisingly found that the contact of iron-containing metal surfaces with a polycarbonate melt containing one or more phosphorus compounds leads to a surface modification which virtually completely suppresses the damage to polycarbonate on subsequent use of the metal surfaces for the production or processing.

The pretreatment according to the invention can be applied to iron-containing steels, such as, for example, high-alloy chromium-nickel stainless steels, particularly preferably to the stainless steel 1.4571 (X6CrNiMoTi 17-12-2, Ti-stabilized chromium-nickel steel). For this purpose, the steel surfaces are brought into contact with the PC melt without additional pretreatment and without downstream wash or cleaning steps. The treatment can therefore be effected in situ as a preliminary step before the actual production or processing. The pretreatment is effected in the temperature range from 280 to 480° C., preferably from 300° C. to 380° C., particularly preferably from 320 to 350° C. Action times are 1 to 24 hours, preferably 6 to 12 hours. During the action time, the melt remains in stationary contact with the metal surface. The treatment can be carried out both in air and under inert atmosphere. Aqueous phosphoric acid and organic phosphate or phosphite compounds can be used as phosphorus compounds. For example, the following trialkyl phosphates, triaryl phosphates PO(OR)3 and dialkyl phosphates PO(OR)2OH and phosphites P(OR)3 or (RO)P(OR')OH can be used:

Trimethyl phosphate, triethyl phosphate, tributyl phosphate, trioctyl phosphate, tris(2-ethylhexyl)phosphate, trinonyl phosphate, tridecyl phosphate tris(2-chloroethyl) phosphate, tricyclohexyl phosphate, triphenyl phosphate, diethyl phosphate, dibutyl phosphate, dioctyl phosphate, diphenyl phosphate, trimethyl phosphite, triethyl phosphite, tributyl phosphite, trioctyl phosphite, triphenyl phosphite, dibutyl phosphite, diphenyl phosphite.

The phosphorus compound is added to the polycarbonate melt in concentrations of 0.1 g of phosphate per $m^2$ of metal surface to 5000 g per $m^2$ of metal surface. Preferably 1 g per $m^2$ to 100 g per $m^2$ and particularly preferably 5 g per $m^2$ to 50 g per $m^2$ are used. Particularly preferably, higher concentrations are used in the case of short action times and lower concentrations in the case of a long action time. The phosphorus compound is metered as pure substance or solution, prior to melting, into the PC pellets or mixed into the PC melt.

These metal surfaces may be, for example, optionally heated pipes for transporting polycarbonate melts, tube bundles or the internal surfaces of heat exchangers, reaction vessels or filtration apparatuses or other melt-conveying parts of extruders and pumps. The preparation of polycarbonate is effected as a rule in plant components, i.e. pipes, reaction vessels, etc., comprising steel or comprising special steel alloys. In these plants, the polycarbonate is produced, transported, concentrated, isolated and further processed.

In a further configuration of the invention, metal surfaces pretreated by a thermal oxidative procedure at temperatures of 400° C. to 500° C., preferably of 440° C. to 460° C., in air or an oxygen-containing atmosphere are used and are pretreated with phosphite-containing PC melt in the same temperature and concentration range as stated for the phosphate-containing PC melt, in air or under inert gas.

As an alternative to the described in situ pretreatment using a static PC melt, continuous feeding of phosphate-containing PC melt to the metal surface is possible. For this purpose, the phosphate-containing PC melt flows continuously through the surface of pipelines, vessels, apparatuses or machines which is to be treated, over a period of several hours, preferably from 6 to 12 hours, at temperatures from 280° C. to 480° C., preferably from 320° C. to 350° C.

Particularly preferably, the process according to the invention is used in the preparation and the processing, such as compounding or injection moulding, of polycarbonate. Here, it has advantages especially in the case of the colour of the polycarbonate, in the case of uncoloured polycarbonate, measured by the yellowness index (YI). Here, the screw elements according to the invention are particularly preferably used in the devolatilization zone.

Polycarbonates in the context of the present invention are homopolycarbonates and copolycarbonates; the polycarbonates may be linear or branched in a known manner.

Preferred methods of preparation for the polycarbonates to be used according to the invention, including the polyester carbonates, are the known interfacial process and the known melt transesterification process.

Phosgene preferably serves as the carbonic acid derivative in the first case and preferably diphenyl carbonate in the latter case. Catalysts, solvents, working-up, reaction conditions, etc. for the polycarbonate preparation are sufficiently described in both cases and are known.

A part, up to 80 mol %, preferably from 20 mol % to 50 mol %, of the carbonate groups in the polycarbonates suitable according to the invention can be replaced by aromatic dicarboxylic acid ester groups. Such polycarbonates which contain both acid radicals of carbonic acid and acid radicals of aromatic dicarboxylic acids incorporated into the molecular chain are, accurately defined, aromatic polyester carbonates.

For the sake of simplicity, they are to be subsumed in the present application under the overall term of thermoplastic, aromatic polycarbonates.

The process according to the invention is used in particular in the preparation of polycarbonates. The present invention therefore also relates to a process for the preparation of polycarbonates, characterized in that at least one step of the preparation process comprises an extrusion process according to the invention.

The preparation of polycarbonates with the use of the process according to the invention is effected in a known manner from diphenols, carbonic acid derivatives, optionally chain terminators and optionally branching agents, a part of the carbonic acid derivatives being replaced by aromatic dicarboxylic acids or derivatives of the dicarboxylic acids for the preparation of the polyester carbonates, in particular by aromatic dicarboxylic acid ester structural units, according to the proportion of carbonate structural units to be replaced in the aromatic polycarbonates.

By way of example for the preparation of polycarbonates, reference may be made here to Schnell, "Chemistry and Physics of Polycarbonates", Polymer Reviews, Volume 9, Interscience Publishers, New York, London, Sydney 1964.

The thermoplastic polycarbonates which are preferably used in the process according to the invention, including the thermoplastic, aromatic polyester carbonates, have an average molecular weight $M_w$ (determined by measurement of the relative viscosity at 25° C. in $CH_2Cl_2$ and at a concentration of 0.5 g per 100 ml of $CH_2Cl_2$) of 12000 to 120000, preferably of 15000 to 80000 and in particular of 15000 to 60000.

Diphenols suitable for the process according to the invention for the preparation of polycarbonate are widely described in the prior art.

Suitable diphenols are, for example, hydroquinone, resorcinol, dihydroxybiphenyl, bis(hydroxyphenyl)alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes and compounds thereof which are alkylated, alkylated on the nucleus and halogenated on the nucleus.

Preferred diphenols are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxybiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, page 28 et seq.; page 102 et seq., and in D. G. Legrand, J. T. Bendler, Handbook of Polycarbonate Science and Technology, Marcel Dekker New York 2000, page 72 et seq.

Only one diphenol is used in the case of the homopolycarbonates and a plurality of diphenols are used in the case of the copolycarbonates, it of course being possible for the diphenols used, as well as all other chemicals and auxiliaries added to the synthesis, to be contaminated with the impurities originating from their own synthesis, handling and storage, although it is desirable to work with raw materials which are as pure as possible.

The diaryl carbonates suitable for the reaction with the dihydroxyaryl compounds in the melt transesterification are those of the general formula (II)

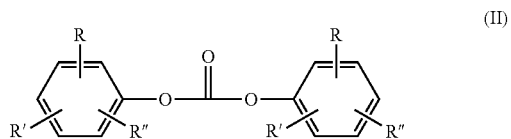

in which

R, R' and R" independently of one another, are identical or different and represent hydrogen, linear or branched $C_1$-$C_{34}$-alkyl, $C_7$-$C_{34}$-alkylaryl or $C_6$-$C_{34}$-aryl, R may furthermore denote —COO—R'", in which R'" represents hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates and di(methylphenyl)carbonates, 4-ethylphenyl phenyl carbonate, di(4-ethylphenyl)carbonate, 4-n-propylphenyl phenyl carbonate, di(4-n-propylphenyl)carbonate, 4-isopropylphenyl phenyl carbonate, di(4-isopropylphenyl)carbonate, 4-n-butylphenyl phenyl carbonate, di(4-n-butylphenyl)carbonate, 4-isobutylphenyl phenyl carbonate, di(4-isobutylphenyl)carbonate, 4-tert-butylphenyl phenyl carbonate, di(4-tert-butylphenyl)carbonate, 4-n-pentylphenyl phenyl carbonate, di(4-n-pentylphenyl)carbonate, 4-n-hexylphenyl phenyl carbonate, di(4-n-hexylphenyl)carbonate, 4-isooctylphenyl phenyl carbonate, di(4-isooctylphenyl)carbonate, 4-n-nonylphenyl phenyl carbonate, di(4-n-nonylphenyl)carbonate, 4-cyclohexylphenyl phenyl carbonate, di(4-cyclohexylphenyl)carbonate, 4-(1-methyl-1-phenylethyl)phenyl phenyl carbonate, di[4-(1-methyl-1-phenylethyl)phenyl]carbonate, biphenyl-4-yl phenyl carbonate, di(biphenyl-4-yl)carbonate, 4-(1-naphthyl)phenyl phenyl carbonate, 4-(2-naphthyl)phenyl phenyl carbonate, di[4-(1-naphthyl)phenyl]carbonate, di[4-(2-naphthyl)phenyl]carbonate, 4-ohenoxyphenyl phenyl carbonate, di(4-phenoxyphenyl)carbonate, 3-pentadecylphenyl phenyl carbonate, di(3-pentadecylphenyl)carbonate, 4-tritylphenyl phenyl carbonate, di(4-tritylphenyl)carbonate, methylsalicylate phenyl carbonate, di(methylsalicylate)carbonate, ethylsalicylate phenyl carbonate, di(ethylsalicylate) carbonate, n-propylsalicylate phenyl carbonate, di(n-propylsalicylate)carbonate, isopropylsalicylate phenyl carbonate, di(isopropylsalicylate)carbonate, n-butylsalicylate phenyl carbonate, di(n-butylsalicylate) carbonate, isobutylsalicylate phenyl carbonate, di(isobutylsalicylate)carbonate, tert-butylsalicylate phenyl carbonate, di(tert-butylsalicylate)carbonate, di(phenylsalicylate) carbonate and di(benzylsalicylate) carbonate.

Particularly preferred diaryl compounds are diphenyl carbonate, 4-tert-butylphenyl phenyl carbonate, di(4-tert-butylphenyl)carbonate, biphenyl-4-yl phenyl carbonate, di(biphenyl-4-yl)carbonate, 4-(1-methyl-1-phenylethyl)phenyl phenyl carbonate, di[4-(1-methyl-1-phenylethyl)phenyl]carbonate and di(methylsalicylate)carbonate.

Diphenyl carbonate is very particularly preferred.

It is possible to use either one diaryl carbonate or different diaryl carbonates.

The diaryl carbonates can also be used with residual contents of the monohydroxyaryl compounds from which they were prepared. The residual contents of the monohydroxyaryl compounds may be up to 20% by weight, preferably up to 10% by weight, particularly preferably up to 5% by weight and very particularly preferably up to 2% by weight.

Based on the dihydroxyaryl compound(s), in general 1.02 to 1.30 mol of the diaryl carbonate(s), preferably 1.04 to 1.25 mol, particularly preferably 1.045 to 1.22 mol, very particularly preferably 1.05 to 1.20 mol per mole of dihydroxyaryl compound are used. It is also possible to use mixtures of the abovementioned diaryl carbonates, the moles mentioned above per mole of dihydroxyaryl compound then relating to the total amount of the mixture of the diaryl carbonates.

The monofunctional chain terminators required for regulating the molecular weight, such as, for example, phenol or alkylphenols, in particular phenol, p-tert-butylphenol, isooctylphenol, cumylphenol, the chlorocarbonic acid esters thereof or acid chlorides of monocarboxylic acids or mixtures of these chain terminators, are either fed together with the bisphenolate or the bisphenolates to the reaction or added at any desired time to the synthesis, provided that phosgene or chlorocarbonic acid terminal groups are still present in the reaction mixture or, in the case of the acid chlorides and chlorocarbonic acid esters as chain terminators, provided that sufficient phenolic terminal groups of the resulting polymer are available. Preferably, however, the chain terminator or terminators is or are added after the phosgenation at a site where, or at a time when, phosgene is no longer present but the catalyst has not yet been metered. Alternatively, they can also be metered in before the catalyst, together with the catalyst or in parallel.

In the same way, branching agents or mixtures of branching agents are optionally added to the synthesis. Usually, however, branching agents are added before the chain terminators. As a rule, trisphenols, quaterphenols or acid chlorides of tri- or tetracarboxylic acids or mixtures of the polyphenols or of the acid chlorides are used. Some of the compounds suitable as branching agents and having three or more than three phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The catalysts preferably used in the phase boundary synthesis of polycarbonate are tertiary amines, in particular triethylamine, tributylamine, trioctylamine, N-ethylpiperidine, N-methylpiperidine, N-iso/n-propylpiperidine, quaternary ammonium salts, such as tetrabutylammonium, tributylbenzylammonium and tetraethylammonium hydroxide, chloride, bromide, hydrogen sulphate and tetrafluoroborate, and the phosphonium compounds corresponding to the ammonium compounds. These compounds are described as typical phase boundary catalysts in the literature, are commercially available and are familiar to the person skilled in the art. The catalysts can be added individually, as a mixture or side by side and in succession to the synthesis, optionally also before the phosgenation, but metering after the phosgenation is preferred, unless an onium compound or a mixture of onium compounds is used as catalysts. In this case, an addition before the phosgene metering is preferred. The metering of the catalyst or of the catalysts can be effected as such, in an inert solvent, preferably the solvent of the polycarbonate synthesis, or as an aqueous solution, in the case of the tertiary amines as the ammonium salts thereof with acids, preferably mineral acids, in particular hydrochloric acid. With the use of a plurality of catalysts or the metering of portions of the total amount of catalyst, it is of course also possible to carry out different methods of metering at different sites or at different times. The total amount of the catalysts used is 0.001 to 10 mol %, based on moles of bisphenols used, preferably 0.01 to 8 mol %, particularly preferably 0.05 to 5 mol %.

Catalysts which may be used in the melt transesterification process for the preparation of polycarbonates are the basic catalysts known in the literature, such as, for example, alkali metal and alkaline earth metal hydroxides and oxides and/or onium salts, such as, for example, ammonium or phosphonium salts. Preferably onium salts, particularly preferably phosphonium salts, are used in the synthesis. Such phosphonium salts are, for example, those of the general formula (IV)

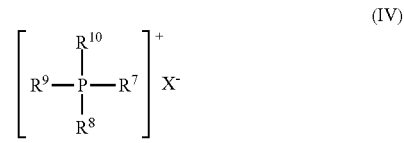

(IV)

in which $R^{7-10}$ represent identical or different optionally substituted $C_1$-$C_{10}$-alkyl, $C_6$-$C_{14}$-aryl, $C_7$-$C_{15}$-arylalkyl or $C_5$-$C_6$-cycloalkyl radicals, preferably methyl, or $C_6$-$C_{14}$-aryl, particularly preferably methyl or phenyl, and $X^-$ represents an anion selected from the group consisting of hydroxide, sulphate, hydrogen sulphate, hydrogen carbonate, carbonate, halide, preferably chloride, and alkylate or arylate of the formula $-OR^{11}$, in which $R^{11}$ represents an optionally substituted $C_6$-$C_{14}$-aryl, $C_7$-$C_{15}$-arylalkyl or $C_5$-$C_6$-cycloalkyl radical, $C_1$-$C_{20}$-alkyl, preferably phenyl.

Particularly preferred catalysts are tetraphenylphosphonium chloride, tetraphenylphosphonium hydroxide and tetraphenylphosphonium phenolate; tetraphenylphosphonium phenolate is very particularly preferred.

The catalysts are preferably used in amounts of $10^{-8}$ to $10^{-3}$ mol, particularly preferably in amounts of $10^{-7}$ to $10^{-4}$ mol, based on one mole of dihydroxyaryl compound.

Optionally, it is also possible to use cocatalysts in order to increase the rate of the polycondensation.

These may be, for example, alkaline salts of alkali metals and alkaline earth metals, such as hydroxides, optionally substituted $C_1$-$C_{10}$-alkoxides and $C_6$-$C_{14}$-aryl oxides of lithium, sodium and potassium, preferably hydroxides, optionally substituted $C_1$-$C_{10}$-alkoxides or $C_6$-$C_{14}$-aryl oxides of sodium. Sodium hydroxide, sodium phenolate or the disodium salt of 2,2-bis(4-hydroxyphenyl)propane are preferred.

If alkali metal or alkaline earth metal ions are added in the form of their salts, the amount of alkali metal or alkaline earth metal ions, determined, for example, by atomic absorption spectroscopy, is 1 to 500 ppb, preferably 5 to 300 ppb and most preferably 5 to 200 ppb, based on polycarbonate to be formed. In preferred embodiments of the process according to the invention, however, no alkali metal salts are used.

The polycarbonate synthesis can be carried out continuously or batchwise. The reaction can therefore be effected in stirred vessels, tubular reactors, pumped-circulation reactors or stirred vessel cascades or combinations thereof. By using the mixing elements already mentioned, it is ensured that aqueous and organic phase separate as far as possible only when the synthesis mixture has completely reacted, i.e. contains no more hydrolysable chlorine from phosgene or chlorocarbonic acid esters.

After introduction of the phosgene in the interfacial process, it may be advantageous thoroughly to mix the organic phase and the aqueous phase for a certain time before adding any branching agent (unless this is metered together with the bisphenolate), chain terminator and catalyst. Such a post-reaction time may be advantageous after any metering. The subsequent stirring times are 10 seconds to 60 minutes, preferably 30 seconds to 40 minutes, particularly preferably 1 to 15 minutes.

The organic phase may consist of a solvent or mixtures of a plurality of solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene and mixtures thereof. However, it is also possible to use aromatic hydrocarbons, such as benzene, toluene, m/p/o-xylene, or aromatic ethers, such as anisole, alone, as a mixture with chlorinated hydrocarbons or in addition to chlorinated hydrocarbons. Another embodiment of the synthesis uses solvents which do not dissolve polycarbonate but only swell it. It is therefore also possible to use nonsolvents for polycarbonate in combination with solvents. Solvents used may also be solvents which are soluble in the aqueous phase, such as tetrahydrofuran, 1,3/1, 4-dioxane or 1,3-dioxolane, if the solvent components form the second organic phase.

The completely reacted, at least two-phase reaction mixture containing at most traces (<2 ppm) of chlorocarbonic acid esters is allowed to stand for phase separation. The aqueous alkaline phase is possibly passed completely or partly back into the polycarbonate synthesis as aqueous phase or fed for wastewater working-up, where solvent and catalyst components are separated off and recycled. In another variant of the working-up, after the organic impurities, in particular solvents and polymer residues, have been separated off and optionally after a certain pH has been established, for example by addition of sodium hydroxide solution, the salt is separated off and can, for example, be fed to the chloroalkali electrolysis, while the aqueous phase is optionally recycled to the synthesis.

The organic phase containing the polycarbonate can now be purified to eliminate all contaminations of an alkaline, ionic or catalytic type. Even after one or more settling processes, the organic phase still contains fractions of the aqueous alkaline phase in fine droplets and the catalyst, as a rule a tertiary amine. The settling processes can optionally be supported if the organic phase runs through settling vessels, stirred vessels, coalescers or separators or combinations thereof, it optionally being possible to meter in water in any or some separation steps, in certain circumstances, with the use of active or passive mixing elements.

After this rough separation of the alkaline, aqueous phase, the organic phase is washed once or several times with dilute acids, mineral acids, carboxylic acids, hydroxycarboxylic acids and/or sulphonic acids. Aqueous mineral acids, in particular hydrochloric acid, phosphorous acid and phosphoric acid or mixtures of these acids, are preferred. The concentration of these acids should be in the range of 0.001 to 50% by weight, preferably 0.01 to 5% by weight.

Furthermore, the organic phase is washed repeatedly with demineralized or distilled water. The separation of the organic phase optionally dispersed with parts of the aqueous phase after the individual wash steps is effected by means of settling vessels, stirred vessels, coalescers or separators or combinations thereof, it being possible to meter in the wash water between the wash steps, optionally with the use of active or passive mixing elements.

Between these wash steps or even after the wash, acids, preferably dissolved in the solvent which forms the basis of the polymer solution, can optionally be added. Hydrogen chloride gas and phosphoric acid or phosphorous acid, which can optionally also be used as mixtures, are preferably used here.

Aromatic dicarboxylic acids suitable for the preparation of the polyester carbonates are, for example, phthalic acid, terephthalic acid, isophthalic acid, test-butylisophthalic acid, 3,3'-diphenyldicarboxylic acid, 4,4'-diphenyldicarboxylic acid, 4,4-benzophenone dicarboxylic acid, 3,4'-benzophenone dicarboxylic acid, 4,4'-diphenyl ether dicarboxylic acid, 4,4'-diphenyl sulphone dicarboxylic acid, 2,2-bis(4-carboxyphenyl)propane, trimethyl-3-phenylindane-4,5'-dicarboxylic acid.

Among the aromatic dicarboxylic acids, terephthalic acid and/or isophthalic acid are particularly preferably used.

Derivatives of the dicarboxylic acids are the dicarboxylic acid dihalides and the dicarboxylic acid dialkyl esters, in particular the dicarboxylic acid dichlorides and the dicarboxylic acid dimethyl esters.

The replacement of the carbonate groups by the aromatic dicarboxylic acid ester groups takes place substantially stoichiometrically and also quantitatively, so that the molar ratio of the reactants occurs again also in the prepared polyester carbonate. The incorporation of the aromatic dicarboxylic acid ester groups can be effected both randomly and blockwise.

In the context of the invention, $C_1$-$C_4$-alkyl represents, for example, methyl, ethyl, n-propyl, isopropyl, n-butyl, sec-butyl, tert-butyl, $C_1$-$C_6$-alkyl moreover represents, for example, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, $C_1$-$C_{10}$-alkyl moreover represents, for example, n-heptyl and n-octyl, pinacyl, adamantyl, the isomeric menthyls, n-nonyl, n-decyl, $C_1$-$C_{34}$-alkyl moreover represents, for example, n-dodecyl, n-tridecyl, n-tetradecyl, n-hexadecyl or n-octadecyl. The same applies to the corresponding alkyl radical, for example in aralkyl or alkylaryl, alkylphenyl or alkylcarbonyl radicals. Alkylene radicals in the corresponding hydroxyalkyl or aralkyl or alkylaryl radicals represent, for example, the alkylene radicals corresponding to the above alkyl radicals.

Aryl represents a carbocyclic aromatic radical having 6 to 34 skeletal carbon atoms. The same applies to the aromatic moiety of an arylalkyl radical, also referred to as aralkyl radical, and to aryl constituents of more complex groups, such as, for example, arylcarbonyl radicals.

Examples of $C_6$-$C_{34}$-aryl are phenyl, o-, p- and m-tolyl, naphthyl, phenanthrenyl, anthracenyl or fluorenyl.

Arylalkyl or aralkyl denotes, in each case independently, a straight-chain, cyclic, branched or unbranched alkyl radical according to the above definition, which may be monosubstituted, polysubstituted or completely substituted by aryl radicals according to the above definition.

The preceding lists are to be understood as being by way of example and not as limiting.

In the context of the present invention, ppb and ppm are to be understood as meaning parts by weight—unless stated otherwise.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The pretreatment of the metallic test specimens is carried out in air or under argon in batch reactors which are not stirred. The metallic test specimens used are, for example, samples of austenitic (1.4571) or martensitic (1.4122) stainless steels always having the same surface roughness established by grinding with the same particle size. No additional pretreatment for the test specimens takes place. The desired amount of phosphate, for example in the form of aqueous phosphoric acid or as organyl phosphate, is metered into the PC pellets at room temperature (Makrolon® 2600, Bayer MaterialScience). This mixture is then heated to the treatment temperature in the presence of the metallic test specimen. After the end of the action time, the metal sample is completely freed from the polycarbonate melt by dissolving in methylene chloride and then used in the test without further pretreatment. In a continuous setup, the dissolution step after the phosphate treatment can be dispensed with and the phosphate-containing PC melt expelled directly with the actual product.

In order to assess the harmful effect of the pretreated metal surfaces at different temperatures, the test specimens pretreated as described were tested at two temperature and residence time settings. In each case heating experiments under inert conditions (argon) were carried out here at 340° C. (6 h residence time) and 290° C. (96 h residence time). All example experiments were carried out with polycarbonate Makrolon® CD2005 (Bayer Material Science) from the same batch.

Evaluation criteria are the yellowness index (YI, determination according to ASTM E313-00 (2000), data for a 4 mm thick coloured sample sheet in each case) and the mass of the PC residue formed on a standardized metal surface [mg/cm$^2$], which remains behind in undissolved form after 16 hours in methylene chloride at room temperature.

Reference Example 1

Without metal contact

Comparative Example 2

1.4571 without pretreatment

Example 3

Pretreatment of 1.4571 (X6CrNiMoTi 17-12-2) with 21 g per m$^2$ of PO$_4^{3-}$ as H$_3$PO$_4$ in PC at 340° C. for 12 hours in air.

Example 4

Pretreatment of 1.4571 with 20 g per m$^2$ of PO$_4^{3-}$ as Bu$_2$HPO$_4$ in PC at 340° C. for 6 hours in air.

Example 5

Pretreatment of 1.4571 with 4 g per m$^2$ of PO$_4^{3-}$ as tris(2-ethylhexyl)phosphate in PC at 340° C. for 6 hours under argon.

Example 6

Pretreatment of 1.4571 with 1300 g per m$^2$ of PO$_4^{3-}$ as phosphoric acid-PC film at 450° C. for 4 hours in air.

Comparative Example 7

Pretreatment of 1.4571 at 450° C. for 4 hours in air.

Example 8

Pretreatment of 1.4571, first at 450° C. for 4 hours in air, then with 17 g per m$^2$ of PO$_4^{3-}$ as triphenyl phosphite at 340° C. for 12 hours under argon.

Comparative Example 9

1.4122 without pretreatment.

Example 10

Pretreatment of 1.4122 with 24 g per m$^2$ of PO$_4^{3-}$ as H$_3$PO$_4$ in PC at 340° C. for 6 hours in air.

TABLE 1

| | YI (340° C., 6 h) | PC residue [mg/cm$^2$] (340° C., 6 h) | YI (290° C., 96 h) | PC residue [mg/cm$^2$] (290° C., 96 h) |
|---|---|---|---|---|
| 1# | 7.2 | — | 7.9 | — |
| 2 | 35.8 | 1 | 47.0 | 26 |
| 3* | 6.5 | 0 | 7.8 | 0 |
| 4* | 4.4 | 0 | 12.7 | 0 |
| 5* | 12.1 | 0 | 13.3 | 0 |
| 6* | 8.1 | 0 | 5.0 | 0 |
| 7 | 31.0 | 10 | 54.9 | 7 |
| 8* | 8.2 | 0 | not measured | |
| 9 | 89.4 | 11 | not measured | |
| 10* | 14.8 | 0 | 21.0 | 1 |

*examples according to the invention
Reference PC without metal contact
—: not determinable

The invention claimed is:

1. A process for passivating the metal surface of an apparatus used for preparing or processing polycarbonates comprising the step of contacting said metal surface with a polycarbonate melt comprising one or more phosphorus compounds at least partly in the regions of said metal surface which are in contact with reagents.

2. The process of claim 1, wherein said contacting is effected with said polycarbonate melt comprising one or more phosphorus compounds at a temperature in the range of from 280 to 480° C. with a residence time of from 1 to 24 hours.

3. The process of claim 1, wherein the concentration of said one or more phosphorus compounds in said polycarbonate melt is in the range of from 0.1 g to 5000 g of phosphate per m$^2$ of metal surface.

4. The process of claim 1, wherein said one or more phosphorus compounds are phosphoric acid or phosphoric acid derivatives or organic phosphate compounds.

5. The process of claim 1, wherein said one or more phosphorus compounds is a phosphite or a phosphate.

6. The process of claim 1, wherein said contacting is effected in the presence of an oxygen-containing gas or under inert gas.

7. The process of claim 1, wherein said metal surface is thermally pretreated in an oxidizing atmosphere before the contacting with said polycarbonate melt comprising one or more phosphorus compounds.

8. An apparatus for preparing or processing of polycarbonates, wherein the metal surfaces used in the preparation or processing of said polycarbonates have been passivated according to the process of claim 1.

9. A process for preparing polycarbonate comprising the step of obtaining polycarbonate via melt polycondensation of a bisphenol with a carbonate diester in the apparatus of claim 8.

10. The process of claim 9, wherein said bisphenol is bisphenol A.

* * * * *